United States Patent Office 2,936,123
Patented May 10, 1960

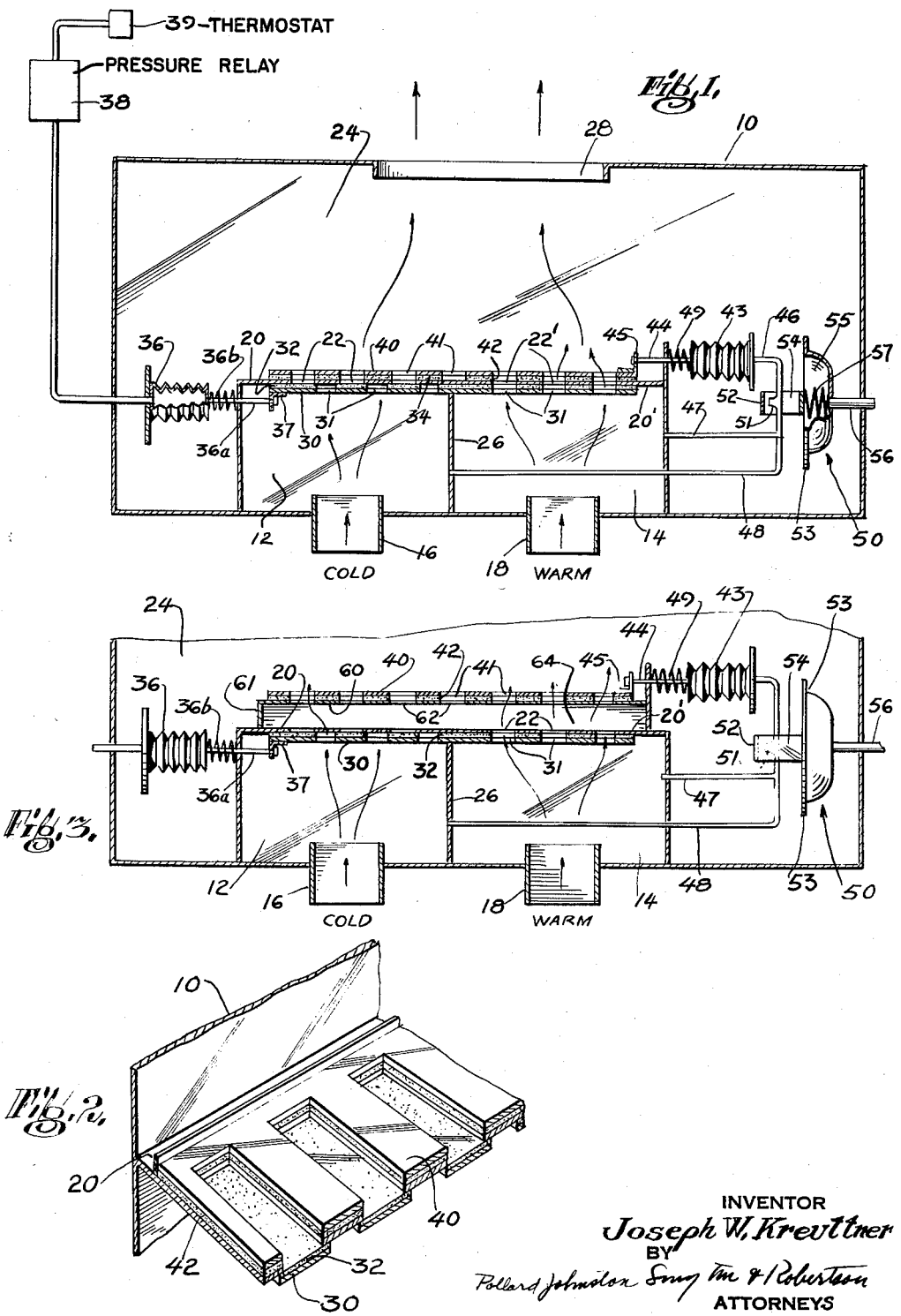

2,936,123

AIR CONDITIONING APPARATUS

Joseph W. Kreuttner, North Tarrytown, N.Y., assignor to Buensod-Stacey, Incorporated, New York, N.Y., a corporation of Delaware Application May 4, 1955, Serial No. 506,022

2 Claims. (Cl. 236—13)

This invention relates to new and improved flow control devices for air conditioning systems wherein warm and cold air are supplied separately to a mixing and distributing unit in a zone or room being conditioned.

The present invention is particularly adapted for high pressure air conditioning systems of this type, but it may be used to advantage for other systems. High pressure systems are those in which the pressure is over about 2" of water static pressure and the potential velocity of the air in the air ducts is between about 1500 to 3500 feet per minute.

In air conditioning systems of this type, flow conditions change continuously, especially as a result of variation in air demands in the zones, and it has been found that by controlling the flow rate into the individual zones so as to maintain the flow substantially constant, the undesirable noise associated with the operation of air distributing units of such systems is substantially eliminated.

It is an object of this invention to provide new combinations of air mixing and air volume controls for air distributing units for air conditioning systems of the above mentioned type, by which substantially constant flow rates of conditioned air into the individual zones are maintained during the operation of the system.

Another object of this invention is to provide a unitary proportioning damper and air volume control device, which is simple and compact in construction and operation, reliable in performance, and readily adjustable so that air temperature and volumetric rate of air delivery can be set and automatically maintained at any preselected value within a wide range.

According to one feature of this invention, the air mixing and distributing unit for individual zones is formed with adjoining cold air and warm air plenum chambers that are respectively connected with warm and cold air supply ducts. Each of the warm and cold air chambers has a fluid connection with a mixing chamber in the unit through flow resistance plate means having apertures which are traversed by the air passing from the warm and cold air chambers into a mixing chamber. The mixed air is subsequently discharged into the room or zone being conditioned. Flow through the apertures in the flow resistance plate means is controlled by a pair of dampers, one of which is disposed on the upstream side of the plate means and the other of which is disposed on the downstream side of the plate means. The damper on the upstream side of the plate means is movable to vary proportionally the apertures therein open to the respective warm and cold air chambers for proportioning the warm and cold air admitted into the mixing chamber so as to maintain the air discharged into the room at preselected temperatures. Merely by way of example, a thermostat such as shown in Serial No. 365,379 filed July 1, 1953, now Patent 2,794,598 granted June 4, 1957, may be used. The damper on the downstream side of the plate means is movable to vary the size of the effective open area of the apertures therein to control the total volume rate of flow from both warm and cold air chambers into the mixing chamber. The latter damper is preferably operated by a fluid pressure operated motor which utilizes air under pressure from the supply ducts to operate the same, the effective air pressure acting on the motor being controlled by a pilot member responsive to static pressure in the mixing chamber.

Another feature of this invention is the provision of a damper in the form of an apertured plate slidably mounted on the upstream side of the apertured walls, through which air is passed from air supply chambers into the air mixing chamber, for movement relative thereto to bring its apertures in and out of registry with the apertures in such walls. The side of the apertured plate bearing against the apertured walls has a felt covering that bears against the apertured walls under the force of the pressure in the supply chambers on the plate and serves to seal the openings in the wall against leakage in addition to its normal function of reducing friction when the plate is moved relative to such walls.

These and other objects, features and advantages of the invention will become apparent from the following detailed description of the accompanying drawings which are merely exemplary.

In the drawings:

Fig. 1 is a vertical section through an air distributing unit embodying this invention;

Fig. 2 is a fragmentary perspective view of a portion of the damper assembly; and Fig. 3 is a fragmentary vertical section showing another embodiment of this invention.

Referring now to Fig. 1 of the drawings, an air mixing and distributing unit or box in accordance with this invention is shown which comprises a casing 10 having therein in juxtaposition a cold air supply plenum chamber 12 and a warm air supply plenum chamber 14, which are respectively connected with a cold air supply duct 16 and a warm air supply duct 18. The top walls 20, 20' of chambers 12 and 14 are coplanar and are provided with a plurality of apertures 22 and 22' that form openings for the upward passage of air from the respective plenum chambers into an air mixing chamber 24 within the casing 10. In the preferred embodiment shown, the openings 22 and 22' take the form of a series of elongated slots extending transversely in the casing 10 and arranged in tandem on both sides of the partition 26 which separates the warm and cold air chambers. The mixed air is discharged into the zone or room from the distributing box through opening 28 in the top wall of casing 10.

In accordance with the present invention, an improved volume and mixing control arrangement is provided which includes a thermostatically controlled warm air and cold air proportioning damper 30 arranged on the upstream side of discharge openings 22 and 22' and a throttle damper 40 on the downstream side of discharge openings 22 and 22' which is controlled automatically to maintain a preselected volumetric rate of flow into the room during the operation of the air conditioning system.

The proportioning damper 30 is in the form of a flat plate and is slidably mounted for lateral movement on the underside of the top walls 20, 20'. The damper 30 has a series of apertures 31 which correspond in size and shape to discharge apertures 22 and 22'. The spacing between the apertures 31 corresponds generally to the spacing between discharge openings 22 and 22', but the apertures 31 are so arranged that when the apertures on one side of partition 26 are in registry with openings 22', the apertures on the other side of the partition are offset laterally and out of registry with the discharge openings 22. Therefore, when the openings 22 are fully open, the openings 22' are fully closed.

It will be seen from Figure 2 that the slotted form of the openings in damper 30 and top walls 20, 20' minimize the amount of the displacement required of the damper for bringing the apertures 31 completely in and out of registry with apertures 22 and 22'.

Movement of the proportioning damper 30 is controlled by a thermostatically operated bellows motor 36, which has a plunger 36a connected with the damper 30 by an angle piece 37, one arm of which is affixed to the damper and the other arm affixed to the plunger. Although the damper operating motor is shown as an air motor, it is to be understood that other types of motors, such as an electric motor, are equally suitable. In the form shown, the motor 36 has a pressure relay 38 connected with a thermostat 39 disposed in the zone or room being controlled. A compression spring 36b continuously urges the bellows motor 36 to its deflated position in which the damper 30 is held in a position providing maximum warm air flow and minimum cold air flow into the mixing chamber 24. It will be understood that when the temperature in the zone increases, the thermostat will produce an increase in the pressure of the air within bellows motor 36 expanding the bellows and moving the damper 30 to the right as viewed in Figure 1 so as to reduce the effective size of the apertures open to the warm air chamber 14 and increase the effective size of the apertures open to the cold air chamber 12, thereby reducing the proportionate amount of warm air and increasing the proportionate amount of cold air admitted into the zone. When the temperature in the zone decreases, the reverse operation occurs.

A felt mat 32 having apertures 34 corresponding to and aligned with apertures 31 is provided on the damper 30 between the damper and the top walls 20, 20' of the warm and cold air supply ducts. This plate not only serves to reduce friction when the damper 30 moves back and forth on the underside of top walls 20, 20' but also serves as a seal to prevent leakage through the openings 31, 22 and 22' under the action of the pressure in the plenum chambers 12 and 14 against plate 30 which causes the felt mat 32 to bear firmly against the underside of walls 20, 20'.

The volume control damper 40 is slidably mounted for lateral movement on the upper surface of walls 20, 20' and has a plurality of apertures 41, corresponding in size, shape and arrangement with discharge openings 22 and 22', that are movable into and out of registry with such discharge openings to increase and decrease the effective total open area of the opening 22 and 22' in a manner to maintain a predetermined constant volume of air flowing in the mixing chamber and into the zone.

The damper 40 is operated by a fluid pressure motor 43 that is connected with the damper 40 by a plunger 44 and an angle bracket 45. The fluid pressure motor 43 utilizes air from the supply ducts to operate the same, the motor being connected to both the warm air supply chamber 14 and the cold air supply chamber 12 by a fluid line 46 having branches 47 and 48 leading to the respective chambers. Alternatively, the fluid supply line to the fluid pressure motor 43 may be connected to only one of the air supply chambers.

The operating pressure in the motor 43 is controlled by a regulating device, indicated generally at 50, in the mixing chamber 24. The regulating device 50 includes an orifice 51 in fluid line 46 that serves to vent the pressure in said line into the mixing chamber. Flow through the orifice 51 is controlled by a valve plate 52 movable to and from a seated position closing such orifice by a pressure operated diaphragm 53, which is connected to the valve plate 52 by a member 54. Diaphragm 53 is subjected on one side to static pressure in air mixing chamber 24 and to atmospheric pressure on its other side, the diaphragm chamber 55 being opened to the atmosphere through vent 56. A spring 57 is provided in chamber 55 to continuously urge the diaphragm to a position unseating valve plate 52.

When the volumetric rate of flow into the room increases as a result of the change of variable conditions in the supply ducts, the static pressure within mixing chamber 24 increases and is operative upon diaphragm 53 of the regulating device 50 to move the valve plate 52 toward a seated position closing the orifice 51. When this happens, the pressure within the motor 43 increases and effects a movement of the damper 40 to the left, as viewed in Figure 1, so as to reduce the effective size of the discharge openings 22 and 22' and thereby reduce the total volume admitted from both the warm and cold air supply ducts, regardless of the proportioning damper setting. Upon a decrease in the volumetric rate of flow into the zone, the spring 57 will act to return the diaphragm toward its normal unstressed position so as to open the orifice 51 and effect a reduction in pressure in motor 43. When this occurs, a compression spring 49 bearing bearing against the free end of the motor 43 moves it in a direction in which it moves the damper 40 to the right, as viewed in Figure 1, so as to increase the effective size of discharge openings 22 and 22' and thereby increase the total volume of air flowing through such discharge openings.

The control thus provided is extremely sensitive and accurate over a wide range, for it employs a diaphragm sensitive to relatively small variations in static pressure in the mixing chamber to act as a pilot member for changing the pressure of the air within motor 43 so as to cause a force proportional to the force produced by the increase or decrease in such static pressure but much larger than such force to act on the damper motor 43.

It will be seen that the felt mat 42 on the underside of damper 40 serves to reduce friction when the damper 40 is moved back and forth on the top walls 20, 20'. The air flowing through the discharge openings 22 and 22' will tend to raise the damper 40 away from the top walls 20, 20' and in this way complete closure of the discharge openings is avoided.

Another embodiment of the invention is shown in Figure 3 wherein all parts corresponding to the embodiment of Figure 1 are indicated by like reference numerals. In this embodiment volume control is separated from air mixing. As seen in Figure 3 of the drawings, a resistance plate or grid 60 is disposed in spaced relation to walls 20, 20' on the downstream side of the discharge openings 22 in such walls. The resistance plate 60 is formed with end flanges 61 by which it is supported on the top walls 20, 20', the flanges 61 also serving to form with the resistance plate 60 and walls 20, 20' a chamber 64. The resistance plate is formed with a series of apertures 62 corresponding to the discharge apertures 22 and 22' and through which the air passed through apertures 22 must pass to enter chamber 24 in the box 10.

On the downstream side of the openings 62 in resistance plate 60, the volume control damper 40 is mounted for sliding movement to bring the apertures 41 in and out of registry with discharge apertures 62 and functions in the same manner as that of the volume control damper embodiment described in Figure 1.

It will be understood that the foregoing detailed description and the accompanying drawings are illustrative and that the improvements herein disclosed may be embodied in the various forms of construction within the scope of the appended claims.

It will be understood that the foregoing detailed description and the accompanying drawings are illustrative and that the improvements herein disclosed may be embodied in various forms of construction within the scope of the appended claims.

What is claimed is:

1. In an air conditioning distributing unit, air volume and temperature control means for an air conditioning system and the like, the combination comprising an air mixing chamber, warm and cold air plenum chambers, flow resistance plate means having apertures therein to be traversed by air passing from each of said plenum chambers into said mixing chamber, movable plate means positioned adjacent opposite sides of said resistance plate means and having apertures therein to register with the apertures in said resistance plate means for admitting air therethrough from the respective plenum chambers into said mixing chamber, one of said movable plate means having its apertures arranged to proportion the relative amounts of warm and cold air admitted through said resistance plate means and the other of said movable plate means having its apertures arranged to vary the total volume of air flowing through said resistance plate means, power-operated means in driving relation to each of said movable plate means, ambient temperature responsive thermostat control means connected with the power-operated means associated with said one movable plate means for maintaining desired room temperature, and control means connected with the power-operated means associated with said other movable plate means and responsive to pressure changes in said mixing chamber for maintaining a constant volumetric rate of flow through said resistance plate means.

2. In an air conditioning distributing unit, air volume and temperature control means for an air conditioning system and the like, the combination comprising an air mixing chamber, warm and cold air plenum chambers, flow resistance plate means having apertures therein to be traversed by air passing from each of said plenum chambers into said mixing chamber, movable plate means positioned adjacent opposite sides of said resistance plate means and having apertures therein to register with the apertures in said resistance plate means for admitting air therethrough from the respective plenum chambers into said mixing chamber, one of said movable plate means having its apertures arranged to proportion the relative amounts of warm and cold air admitted through said resistance plate means and the other of said movable plate means having its apertures arranged to vary the total volume of air flowing through said resistance plate means, fluid pressure operated means in driving relation to said other movable plate means, said fluid pressure operated means having a fluid connection with at least one of said air plenum chambers for passing air under pressure to such fluid pressure operated means, and means responsive to pressure changes in said mixing chamber to vary the pressure acting on said fluid pressure operated means proportionally to said changes so as to maintain a constant volumetric rate of flow through said resistance plate means.

References Cited in the file of this patent

UNITED STATES PATENTS

| | | |
|---|---|---|
| 699,352 | Titus | May 6, 1902 |
| 1,780,589 | Hendrix | Nov. 4, 1930 |
| 2,425,000 | Paget | Aug. 5, 1947 |
| 2,601,231 | Smith | June 24, 1952 |
| 2,625,331 | Jordan | Jan. 13, 1953 |
| 2,641,871 | Ray | June 16, 1953 |
| 2,705,595 | Carlson et al. | Apr. 5, 1955 |
| 2,772,695 | Harrison | Dec. 4, 1956 |